United States Patent [19]

Koester et al.

[11] Patent Number: 4,752,408

[45] Date of Patent: Jun. 21, 1988

[54] PROCESS FOR COATING FABRIC CARE PREPARATIONS

[75] Inventors: Klaus Koester, Langenfeld; Franz-Josef Carduck, Haan; Heinz-Manfred Wilsberg, Cologne; Rolf Puchta, Haan, all of Fed. Rep. of Germany

[73] Assignee: Henkel Kommanditgesellschaft auf Aktien, Duesseldorf, Fed. Rep. of Germany

[21] Appl. No.: 916,908

[22] Filed: Oct. 9, 1986

[30] Foreign Application Priority Data

Nov. 18, 1985 [DE] Fed. Rep. of Germany ....... 3540833

[51] Int. Cl.[4] ........................ C11D 17/00; B32B 27/08

[52] U.S. Cl. ................................ 252/90; 252/174.13; 252/174; 428/518; 428/520

[58] Field of Search ...................... 252/90, 91, 174.13, 252/174; 427/212; 428/518, 520

[56] References Cited

U.S. PATENT DOCUMENTS

| | | | |
|---|---|---|---|
| 3,311,576 | 3/1967 | Tauber et al. | 260/17 |
| 4,348,293 | 9/1982 | Clarke et al. | 252/90 |

*Primary Examiner*—Michael R. Lusignan
*Attorney, Agent, or Firm*—Ernest G. Szoke; Henry E. Millson, Jr.; Real J. Grandmaison

[57] ABSTRACT

Solid fabric-care preparations showing a tendency towards troublesome interactions, or constituents thereof, are coated by application of dissolved or dispersed organic film-forming polymers soluble in alkaline medium. Suitable polymers contain in particular carboxyl groups and are preferably derived from vinyl esters. The carboxyl groups emanate from copolymerized carboxylic acids which make up from about 2 to 10 mole % of the copolymer. The copolymers are best prepared in the form of finely divided dispersions and optionally contain a protective colloid and/or an emulsifier.

18 Claims, No Drawings

PROCESS FOR COATING FABRIC CARE PREPARATIONS

BACKGROUND OF THE INVENTION

1. Field of the Invention

This invention relates to a process for coating solid forms of fabric care preparations or constituents thereof showing a tendency towards troublesome interactions.

In the context of the invention, fabric care preparations are understood to be detergents and washing aids. Detergents are in turn understood to be fabric detergents present in solid form, i.e., for example in powder or particulate form, such as granulate, flakes, noodles, as hollow beads, as porous beads optionally charged with liquid detergent ingredients, as shaped articles, for example tablets, bars, spheres, blocks, rigid or flexible strips or sheet-form structures, or constituents thereof, providing they are used in aqueous alkaline medium. The same also applies to preparations present in such forms for cleaning hard surfaces, such as, for example, dishwashing detergents, domestic cleaning preparations, cleaning and disinfecting preparations for sanitary fixtures. The washing aids include, for example, fabric pretreatment and after treatment preparations, bleaches, detergency boosters, fabric softeners, soil repellents, redeposition inhibitors or constituents thereof where they can lead to troublesome interactions with one another or with other constituents of these preparations, with packaging materials, with the surrounding atmosphere or with the skin of the user or where they should best be coated for other reasons, for example for masking an unpleasant odor, such as adheres for example to fatty amine or fish oil derivatives, or for preserving desirable but volatile fragrances. Accordingly, a coating generally assists in avoiding losses of performance and in improving shelf life and handling properties, for example by avoiding agglomerations, moisture penetration, tackiness or skin irritations.

2. Discussion of Related Art

German Patent Application P 34 22 055.0 relates to a fabric care preparation having detergency-boosting properties. This fabric care preparation contains a mixture of detergent ingredients which are embedded in organic, flexible, film-forming water-soluble polymers. In addition to the actual detergency-boosting agents, the fabric care preparations described therein contain additives for improving the solubility of the film-forming polymers in the wash liquor. The active agents themselves improve the removal of fatty, pigment-like and bleachable soil by enhancing the surfactant, bleaching and builder constituents. The fabric care preparations therein are produced in particular in the form of soluble, flexible sheet-form materials in which the film-forming polymer is essentially polyvinyl alcohol. In the event of prolonged storage in moist air, many of these fabric care preparations tend to become damp and tacky under certain conditions where they are able to take up atmospheric moisture.

DESCRIPTION OF THE INVENTION

Other than in the operating examples, or where otherwise indicated, all numbers expressing quantities of ingredients or reaction conditions used herein are to be understood as modified in all instances by the term "about."

In accordance with this invention, the aforementioned disadvantages of the prior art are overcome by a process for coating solid forms of fabric-care preparations showing a tendency towards undesirable interactions, or constituents thereof, by application thereto a coating of dissolved or dispersed organic film-forming polymers which are soluble in aqueous alkaline medium. The polymers may be applied, for example, by spray coating, spread coating, dip coating, by being brought into contact with rollers wetted with solutions or dispersions of the polymers, by casting, by roll coating, by knife coating and, if necessary, subsequent drying. If necessary, the application may be repeated to improve the desired effect. Suitable polymers are applied either as true solutions or as dispersions.

The criterion determining the choice of the polymers is that the polymers should be present either as a true solution or as a finely divided suspension in the alkaline wash liquor before the end of the washing process. Accordingly, "insoluble" means that the polymers are insoluble or non-dispersible in water or in acidic or neutral wash or cleaning liquors.

The coating covers the surface of the detergents and washing aids at least to such an extent that the troublesome interactions are avoided. The coating material itself should not have any unfavorable properties and should release the detergents and washing aids quickly and completely under in-use conditions, i.e. in alkaline wash liquors, at temperatures in the range of from about 10° to 100° C.

In accordance with the invention, suitable polymers are, for example, polymers containing carboxyl groups, more especially copolymers, preferably those based on vinyl esters. A particularly suitable copolymer based on vinyl esters is a copolymer of vinylacetate containing copolymerizable carboxylic acids. The quantity of copolymerized carboxylic acids is from 2 to 10 mole %, based on the copolymer. Copolymers of this type are insoluble in water and are therefore best applied in the form of an aqueous dispersion. Particularly suitable copolymer dispersons contain a protective colloid and, optionally, emulsifiers, the protective colloid content being from 0.5 to 7% by weight, based on the copolymer. Particularly stable copolymer dispersions are obtained with water-soluble polyacrylamide copolymers as a protective colloid. Such copolymer dispersions are known, for example, from U.S. Pat. No. 3,311,576 wherein the copolymer dispersions are used for stiffening fabrics.

Accordingly, the process according to the invention may be used with particular advantage for improving the shelf life and handling properties of fabric care preparations in the form of soluble, flexible sheet-form structures, preferably based on polyvinyl alcohol, with detergency-boosting agents embedded therein. An effective improvement in shelf life for excellent handling properties is obtained by applying the copolymer coating of this invention to the sheet-form material in a quantity of from 25 to 500 g/m$^2$ surface area of the sheet-form material. In addition to the aforementioned copolymers according to U.S. Pat. No. 3,311,576, other copolymers in the form of aqueous dispersions, for example the commercial product Vinnapas®-Dispersion DZN 220, are also suitable coating materials. This particular product is a dispersion of polyvinylacetate containing carboxyl groups. The copolymer dispersions mentioned are applied to flexible sheet-form materials by single or repeated application using a roller impregnated or wetted with the aqueous dispersion and drying the coating at 40° to 90° C. The sheet-form materials are thereby prevented from taking up moisture from the surrounding atmosphere, and are considerably more stable in storage than uncoated sheet-form materials. Another advantage of the coating of this invention is that the coated sheet-form materials have a more pleasant feel when handled by the user.

EXAMPLE

The following example demonstrates the mode of action of the process according to the invention. Fabric care preparations according to German Patent Application P 34 22 055.0 in the form of sheets measuring on average 260×150×1.4 mm and having the following composition:

21% by weight polyvinyl alcohol
16% by weight glycerol/1,2-propylene glycol
1.6% by weight cellulose/methylcellulose
0.8% by weight polyethylene glycol, MW 4000
7% by weight sorbitol
8.5% by weight $C_{14}$–$C_{15}$-oxoalcohol+7 moles ethylene oxide
3% by weight tetradecyltrimethylammonium bromide
0.6% by weight ethylenediamine tetramethylene phosphonic acid, hexasodium salt
8% by weight tetraacetyl ethylenediamine
1.3% by weight oleyl/cetyl alcohol+2 moles ethylene oxide
remainder: inorganic salts, water, inert fillers, foam inhibitors, were stored at various temperatures. Sheets of the same composition which had been coated by the process according to the invention were similarly stored. For the coating, a total of on average 120 g copolymer per square meter surface area of the sheet was applied in two applications using a roller coated with lambskin. After the first application, the coated sheet was dried for 10 minutes at 60° C. in a recirculating-air drying cabinet. After the second application, the sheet was dried for three hours at the same temperature. The coated and uncoated sheets were then packed and stored. After storage, the sheets were assessed by trained examiners both for appearance and for feel on manual removal from the pack. The sheets were stored at 23° C./50% relative air humidity, at 30° C./80% relative air humidity and at 40° C./approx. 20% relative air humidity.

The copolymer used for the coating was a 30% by weight aqueous dispersion of a copolymer of vinylacetate and crotonic acid in a ratio by weight of 18.8:1 containing 2.5% by weight of a water-soluble polyacrylamide as protective colloid for the coating. The water-insoluble copolymer dissolved clearly in dilute sodium hydroxide at a pH value of 9.

Other suitable polymers dissolve in dilute sodium hydroxide at pH values between 7 and 11. The solubility of the polymers in alkaline medium was determined in a turbidimeter of the 1222 type made by Dr. B. Lange, Berlin, using a Knick pH-meter (Knick, Berlin) by determining the pH value at which the clouding of the dispersion after dilution with three times the quantity of water falls below a value of 20% by addition of 0.5N NaOH. This pH is defined as a measure of alkali solubility. Polymers soluble in wash liquors suitable for the purposes of the invention show alkali solubility at pH values of from 7 to 11 and more especially of from 8 to 10. The results obtained after storage for 2 weeks of the uncoated washing additives and the washing additives coated by the process according to the invention are shown in Table 1 below. The appearance of the test sheets and their feel on handling were evaluated; both criteria were reported as "surface quality".

TABLE 1

| Pack type(1) | Storage temperature (°C.) | Surface quality(2) un-coated | Surface quality(2) according to the invention |
|---|---|---|---|
| Carton lined on both sides with polyethylene; pack sealed in polypropylene film | 23 | 3 | 2 |
| | 30 | 3 | 2 |
| | 40 | 3 | 1 |
| Plastic container with screw top | 23 | 3 | 1-2 |
| | 30 | 3 | 2-3 |
| | 40 | 3 | 1 |
| Welded in polyethylene film | 23 | 3 | 1-2 |
| | 30 | 3-4 | 1-2 |
| | 40 | 4 | 1 |

(1)The washing additives were packed and stored as indicated.
(2)1 = dry
2 = feels slightly greasy
3 = feels greasy, liquid visible on surface
4 = wet, heavy secretion of liquid In every pack and at every storage temperature, the surface quality of the samples coated in accordance with the invention (last column of Table 1) was better than that of the uncoated samples.

Similar results were obtained with washing additives which had been similarly coated by the process according to the invention with a commercial dispersion of polyvinylacetate containing carboxyl groups ("Vinnapas ®—Dispersion DZN 220", a product of Wacker, Munich).

We claim:

1. A process for coating a solid, flexible sheet of a fabric-care detergent preparation showing a tendency towards undesirable interactions, or constituents thereof, comprising applying to said sheet of detergent preparation a coating of a dissolved or dispersed organic film-forming polymer which is soluble in aqueous alkaline medium, said polymer containing a carboxyl group.

2. A process in accordance with claim 1 wherein said sheet comprises polyvinyl alcohol embedded with a detergency-boosting agent.

3. A process in accordance with claim 1 wherein said polymer comprises a vinyl ester copolymer.

4. A process in accordance with claim 1 wherein said polymer comprises a copolymer of vinyl acetate containing a copolymerizable carboxylic acid.

5. A process in accordance with claim 4 wherein said copolymerizable carboxylic acid is present in an amount of from about 2 to about 10 mole percent, based on said copolymer.

6. A process in accordance with claim 5 wherein said copolymer is applied in the form of an aqueous dispersion.

7. A process in accordance with claim 1 wherein said coating includes a protective colloid.

8. A process in accordance with claim 7 wherein said protective colloid is present in an amount of from about 0.5 to about 7 percent by weight, based on said polymer.

9. A process in accordance with claim 8 wherein said protective colloid comprises a water-soluble polyacrylamide copolymer.

10. A process in accordance with claim 1 wherein said polymer comprises a dispersion of polyvinylacetate containing a carboxyl group.

11. A process in accordance with claim 2 wherein said coating is applied in an amount of from about 25 to about 500 g./$m^2$ to the surface area of said sheet.

12. A process in accordance with claim 1 including drying said coating at a temperature of from about 40° C. to about 90° C.

13. A composition of matter comprising a solid, flexible sheet of a fabric-care detergent preparation having a tendency towards undesirable interactions, or constituents thereof, wherein said sheet of detergent preparation has a coating of an organic film-forming polymer which is only soluble in aqueous alkaline medium, said polymer containing a carboxyl group.

14. A composition in accordance with claim 13 wherein said polymer comprises a vinyl ester copolymer.

15. A composition in accordance with claim 13 wherein said polymer comprises a copolymer of vinyl acetate containing a copolymerizable carboxylic acid.

16. A composition in accordance with claim 13 wherein said coating includes a protective colloid.

17. A composition in accordance with claim 16 wherein said protective colloid comprises a water-soluble polyacrylamide copolymer.

18. A composition in accordance with claim 15 wherein said copolymerizable carboxylic acid is present in an amount of from about 2 to about 10 mole percent, based on said copolymer.

* * * * *